United States Patent Office 3,557,139
Patented Jan. 19, 1971

3,557,139
DERIVATIVES OF 3-INDAZOLONE-OXIMES AND 3-INDAZOLONE-IMINO SULPHONIC ACIDS
Robert Frederic Michel Sureau, Enghien les Bains, and Victor Marie Dupre, Louvres, France, assignors, by mesne assignments, to Ugine Kuhlmann, Paris, France, a corporation of France
No Drawing. Original application Nov. 15, 1966, Ser. No. 594,395. Divided and this application Jan. 15, 1969, Ser. No. 807,151
Int. Cl. C07d 49/12; C09b 29/36
U.S. Cl. 260—310         1 Claim

ABSTRACT OF THE DISCLOSURE

Indazole compounds of the formula

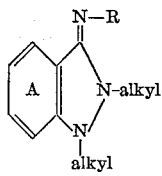

in which the alkyl groups in the 1- and 2-positions are the same or different and contain no more than 4 carbon atoms, wherein R represents an OH or $SO_3H$ radical, and the nucleus A is unsubstituted or substituted by halogen atoms or nitro groups, may be used effectively to produce 1,2-dialkyl-3-indazolone-imonium salts which are useful as indazolium dyestuff intermediates.

---

The present application is a division of application Ser. No. 594,395 filed Nov. 15, 1966 and now abandoned.

The present invention concerns new heterocyclic compounds and dyestuffs resulting therefrom. In particular it relates to new indazole compounds which may be represented by the general formula:

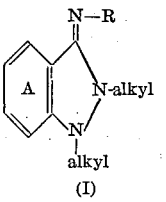

in which the nucleus A may be substituted by halogen atoms or alkyl, alkoxy, nitro, sulphonamido, alkylsulphonyl, trifluoromethyl, cyano, amino, acylamino or hydroxy groups, the alkyl groups in positions 1 and 2 may be the same or different, and R represents an OH or $SO_3H$ radical. The alkyl groups in positions 1 and 2 preferably contain no more than four carbon atoms.

The invention also relates to the imonium salts and the indazolium dyestuffs derived therefrom.

The intermediates according to the invention may be prepared by a process comprising two stages. In the first stage, hydroxylamine is reacted with 1,2-dialkyl-indazolium salts of the general Formula II or (IIbis)

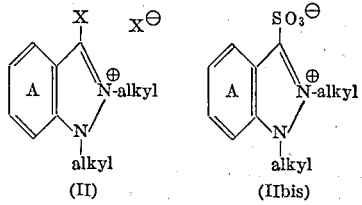

in which the possible substituents of the nucleus A and the alkyl groups in positions 1 and 2 are as defined above. In Formula II, Y is a chlorine or bromine atom and X is a monovalent anion or its equivalent. The hydroxylamine may be used in the form of one of its salts, such as for example the sulphate or hydrochloride, and the reaction may be carried out, for example, in an alcoholic medium in the presence of a tertiary amine such as for example triethylamine.

The reaction products of Formula Ia isolated in this first stage are 1,2-dialkyl-3-indazolone-oximes (R=OH) in the case when an indazolium salt of Formula II is used. The reaction may be expressed as follows:

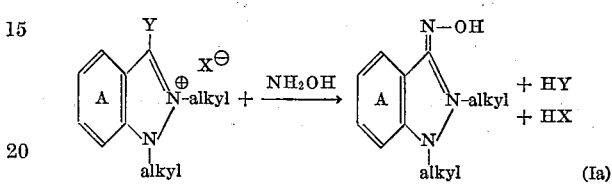

On the other hand, these products are of two types according to the substituents of A when hydroxylamine is reacted with 1,2-dialkyl-indazolium-3-sulphonates of Formula (IIbis).

Thus, in the case when A is substituted by a nitro group in positions 5 or 6, the reaction product formed is a 5- or 6-nitro-1,2-dialkyl-3-indazolone-oxime (R=OH), according to the reaction

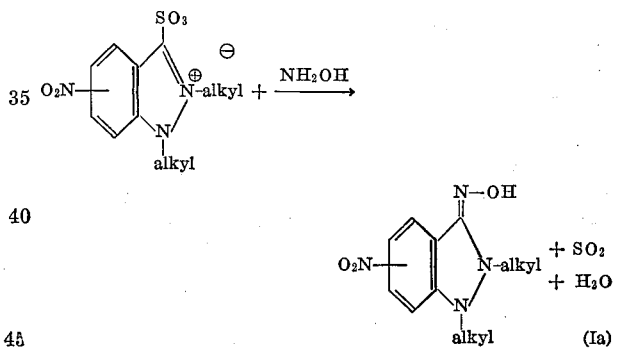

On the other hand, when the nucleus A is not substituted or when it does not contain strongly electro-negative groups, the product isolated after the reaction contains sulphur. Having regard to the analytical results and the properties of the compound obtained, the latter may be considered as a 1,2-dialkyl-3-indazolone-imino-sulphonic acid (i.e. a compound of Formula Ib when R=$SO_3H$). The reaction could be formulated as follows:

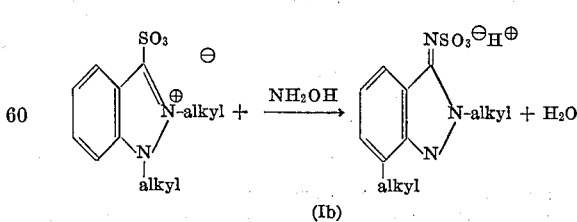

At all events, the intermediate compounds of Formulae Ia and Ib treated in the second stage of the process with anion-providing agents, such as for example phosphorus trichloride, phosphorus tribromide, phosphorus oxychloride or thionyl chloride or more simply even with dilute mineral acids, give according to the invention salts which may be represented by the Formula III, the formation of which may be shown graphically by the two following reactions:

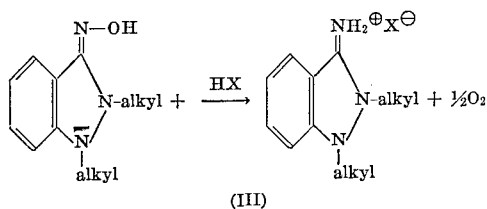

(III)

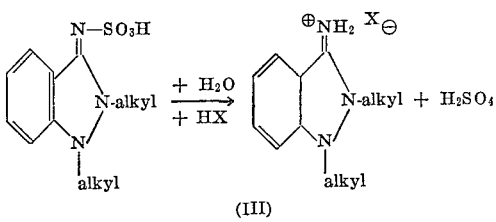

(III)

The compounds (III) may be equally considered either as 1,2-dialkyl - 3-indazolone-imine or better - 3 - indazolone-imonium salts, or as 1,2-dialkyl-3 - amino-indazolium salts, canonical forms of a mesomeric state:

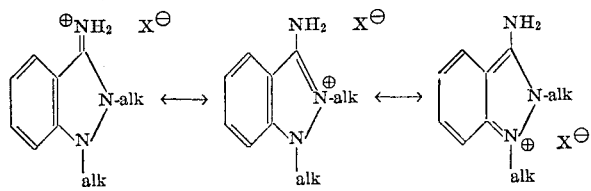

The name 3-imonium-indazolone salts, which better takes into account both the imine character of the substituent in position 3 and the quaternary structure of the molecule, is preferably used here.

The salts of Formula III may also be obtained from compounds (II) and (IIbis) by the direct action of excess ammonia in aqueous solution.

The salts of Formula III are very soluble in hot water, from which they crystallise on cooling. The anionic nature of the radical X is demonstrated by the faculty it has of being exchanged with another anion such as for example, iodide, chromate, ferrocyanide or molybdate, for example by the addition of excess of the corresponding salts to aqueous solutions of the compounds of Formula III. When they are substituted by a nitro group, these compounds are easily reduced by any conventional reducing method and provide the corresponding amino derivatives. The latter, when subjected to hydrolysis in dilute sulphuric acid at temperatures between 160° C. and 200° C. give the hydroxy derivatives with good yields. This result shows the very great stability of these compounds in an acid medium.

On the other hand, the action of caustic alkalis in aqueous solution may cause opening of the ring and lead to N'-(2-cyanophenyl)-N,N'-dialkyl-hydrazines of Formula IV:

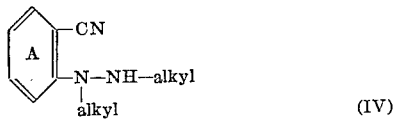

(IV)

This is especially the case when the nucleus A is substituted by an $NO_2$ group, as has been shown by an independent synthesis of the compound of Formula III substituted in position 5 by nitro group. Moreover, this reaction is reversible: the compounds (IV) under the influence of acid agents, cyclise again into derivatives (III).

Finally, in other cases the action of the caustic alkalis on the salts (III) leads to the free imines without opening of the ring. Thus, when A is not substituted, the 1,2-dimethyl-3-imine-indazolone formed is a colourless liquid of pKa 11.1, boiling at 172–173° C. at 15 mm.

The salts of Formula III are intermediate products which can be used for the preparation of dyestuffs, especially those which have an amino or hydroxy group in the 5 or 6 positions on the nucleus A.

The present invention also relates to the new azo dyestuffs derived from these intermediates and corresponding with the following general formulae:

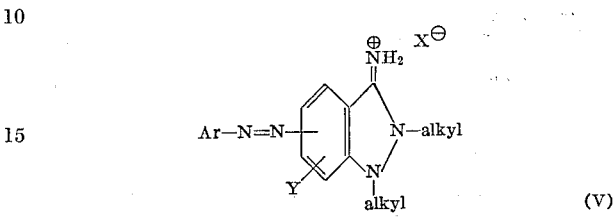

(V)

in which Y represents a hydrogen atom or an amino or hydroxy group, the alkyl groups and X have the same significance as above, and Ar represents an aromatic or heterocyclic residue not containing sulphonic or carboxylic groups and possibly substituted by halogen atoms or alkyl, alkoxy, trifluoromethyl, nitro, hydroxy, free or substituted amino, sulphonamido, aryloxysulphonyl or sulphohalide groups.

Among the dyestuffs of Formula V, those of the formula

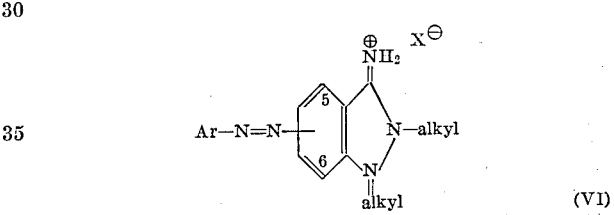

(VI)

may be obtained by coupling the diazo compounds obtained from 5-amino or 6-amino - 1,2-dialkyl - 3-indazolone-imonium salts with coupling compounds of formula ArH. This coupling process is effected by known methods in a neutral or slightly acid medium with amino coupling compounds and in a neutral or slightly alkaline medium with hydroxy or keto-enol couping compounds. The diazotisation of the 5- or 6-amino-1,2-dialkyl-3-indazolone-imonium salts is carried out very easily in dilute acid aqueous medium owing to their great solubility. The imonium group does not take part in this reaction.

The dyestuffs of formulae:

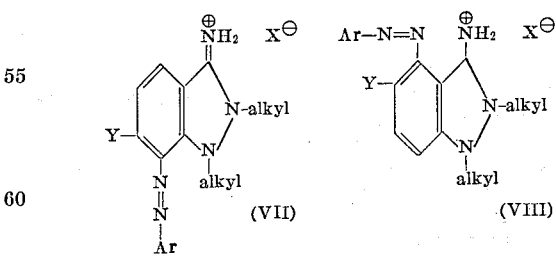

(VII)      (VIII)

may be prepared by coupling a diazo compound of an amine of formula $ArNH_2$, either in neutral or slightly acid aqueous medium with 5- or 6-amino-1,2-dialkyl - 3-indazolone-imonium salts or in neutral or slightly alkaline aqueous medium with 5- or 6-hydroxy - 1,2-dialkyl - 3-indazolone-imonium salts.

The dyestuffs of the above Formulae VI, VII, and VIII show all the tinctorial properties of the cationic dyestuffs and in particular possess an excellent affinity for materials based on acrylonitrile polymers or copolymers, which they dye in very varied and generally very fast shades which range from greenish yellow to blue violet.

In the following examples, to which the invention is not limited, the parts are parts by weight unless the contrary is mentioned.

EXAMPLE 1

A mixture of 27.1 parts of 5-nitro-1,2-dimethyl-3-indazolium-sulphonate, 14 parts of hydroxylamine hydrochloride and 42 parts by volume of triethylamine in 340 parts by volume of absolute ethanol is heated under reflux for half an hour. It is diluted with 1500 parts of water, and the precipitate formed is filtered off, washed and dried at 60° C. 16.5 parts of 5-nitro-1,2-dimethyl-3-indazolone-oxime are thus obtained in the form of deep red crystals, which are recrystallised from ethanol for analysis. M.P. 215° C. (Maquenne block).

Analysis.—Calculated for $C_9H_{10}N_4O_3$ (percent): C, 48.65; H, 4.50; N, 25.21. Found (percent): C, 48.6, 48.9; H, 4.58, 4.55; N, 24.7.

A mixture comprising 11.1 parts of this oxime, 50 parts of dimethyl formamide and 3 parts by volume of phosphorus trichloride is maintained at 30° C. for one and a half hours. The beige precipitate formed is filtered off and washed with absolute alcohol. The product is very soluble in water. It is recrystallised from methanol for analysis, and is identified as 5-nitro-1,2-dimethyl-3-indazolone-imonium chloride, M.P. 290° C.

Analysis.—Calculated for $C_9H_{11}ClN_4O_2$ (percent): C, 44.51; H, 4.53; N, 23.09; Cl, 14.63. Found (percent): C, 44.8; H, 4.69; N, 22.7; Cl, 14.7.

On replacing the phosphorus trichloride in this process by thionyl chloride, under the same conditions 5.3 parts of the same compound, M.P. 290° C., are obtained.

On boiling a mixture of 11 parts of the same oxime, 50 parts of water and 10 parts by volume of 10 N hydrochloric acid, complete solution is obtained in some moments. On cooling, a salt identical with the previous ones crystallises, 10.8 parts being thus obtained.

On treating an aqueous solution of this salt with a solution of sodium dichromate, the instantaneous precipitation of bright black crystals of 5-nitro-1,2-dimethyl-3-indazolone-imonium chromate is observed, which may be recrystallised from dilute ethanol.

Analysis.—Calculated for $C_9H_{11}N_4O_2$ $(CrO_4)\frac{1}{2}$ (percent): N, 21.13. Found (percent): N, 20.95, 21.03.

The action of the caustic alkalis on the 5-nitro-1,2-dimethyl-3-indazolone-imonium chloride is illustrated as follows:

22 parts of 5-nitro-1,2-dimethyl-3-indazolone-imonium chloride are dissolved in 300 parts of water at 50–60° C., and 15 parts by volume of a 10 N solution of caustic soda are added. A red crystalline precipitate is instantaneously formed which after cooling is filtered off, washed and dried at 65° C. The yield is practically quantitative. The product is sparingly soluble in water, and very soluble in organic solvents, and reduces Fehling's solution. On recrystallisation from methanol it melts at 117° C.

Analysis.—Calculated for $C_9H_{10}N_4O_2$ (percent): C, 52.43; H, 4.85; N, 27.19; O, 15.52. Found (percent): C, 52.4, 52.1; H, 5.6, 5.1; N, 26.7; O, 15.9.

The same product is obtained by condensing 2-chloro-5-nitro-benzonitrile with 1,2-dimethyl hydrazine dihydrochloride in a boiling alcoholic medium in the presence of triethylamine. The red compound thus obtained is in an unstable form (M.P. 78° C.) which recrystallises and this time melts sharply at 117° C. The mixture of the two products melts at 117° C. The same compound, N′-(4-nitro-2-cyanophenyl)-N,N′-dimethyl hydrazine, is then found to be present. This compound (not yet described), when treated with dilute hydrochloric acid even in the cold cyclises with re-formation of 5-nitro-1,2-dimethyl-3-indazolone-imonium chloride, M.P. 290° C. (mixed M.P. shows no lowering of M.P.).

Analysis.—Calculated for $C_9H_{11}O_2N_4Cl$ (percent): C, 44.51; H, 4.53; N, 23.09; Cl, 14.63. Found (percent): C, 43.9; H, 4.9; N, 22.8; Cl, 14.2.

300 parts by volume of 28° Bé. ammonia are introduced at 5° C. with stirring into a suspension of 300 parts of 5-nitro-1,2-dimethyl-3-indazolium-sulphonate. Stirring is continued for 16 hours, then a red precipitate is filtered off which, after washing and drying, weighs 75 parts and is impure 5-nitro-1,2-dimethyl-3-indazolone (M.P. 177° C. after recrystallisation from water). The filtrate from the operation is made acid by the addition of hydrochloric acid. On cooling a crystalline precipitate of 5-nitro-1,2-dimethyl-3-indazolone-imonium chloride is formed. Weight after filtering and drying 124 parts.

EXAMPLE 2

48 parts of 5-nitro-1,2-dimethyl-3-indazolone-imonium chloride are introduced in small quantities over a period of 45 minutes into a mixture comprising 200 parts of water, 30 parts of iron powder and 2 parts of 10 N hydrochloric acid, previously boiled for a few minutes.

The mixture is boiled for two hours, allowed to cool and sodium carbonate is added until the pH is 8 or 9. It is filtered, the iron hydroxide sludge is washed with about 200 parts of water, and the filtrate is cooled and 40 parts of sodium chloride are added to it. This addition causes the crystallisation of slightly yellowish white crystals of 5-amino-1,2-dimethyl-3-indazolone-imonium chloride. These are filtered off, washed with a concentrated brine solution, drained and dried at for example between 60° C. and 80° C. 45 parts are thus obtained which are recrystallised from methanol for analysis.

Analysis.—Calculated for $C_9H_{13}ClN_4H_2O$ (percent): C, 46.82; H, 6.51; N, 24.28; Cl, 15.35. Found (percent): C, 47.5; H, 7.1; N, 24.2, 24.7; Cl, 15.7, 15.6.

EXAMPLE 3

On replacing the 5-nitro-1,2-dimethyl-indazolium-3-sulphonate in Example 1 by 6-nitro-1,2-dimethyl-indazolium-3-sulphonate and operating under identical conditions, there are obtained successively, 6-nitro-1,2-dimethyl-3-indazolone-oxime, red crystals of M.P. 166° C. after recrystallisation from methanol.

Analysis.—Calculated for $C_9H_{10}N_4O_3$ (percent): C, 48.65; H, 4.50; N, 25.21. Found (percent): C, 49.0, 49.0; H, 4.89, 4.72; N, 25.1.

And 6-nitro-1,2-dimethyl-3-indazolone-imonium chloride, beige crystals of M.P. 275° C. after recrystallisation from methanol.

Analysis.—Calculated for $C_9H_{11}ClN_4O_2$ (percent): C, 44.5; H, 4.53; N, 23.09; Cl, 14.63. Found (percent): C, 44.8; H, 5.36; N, 23.3, 23.0; Cl, 14.2.

On replacing in the two last paragraphs of Example 1 the 5-nitro - 1,2 - dimethyl-3-indazolone-imonium chloride by its 6-nitro isomer one obtains under the same conditions N′-(5-nitro-2-cyano-phenyl) - N,N′ - dimethylhydrazine in the form of red needles of melting point 162° C.

Analysis.—Calculated for $C_9H_{10}N_4O_2$ (percent): C, 52.43; H, 4.85; N, 27.19. Found (percent): C, 52.4, 52.6; H, 5.2, 5.4; N, 26.9.

The imonium salt being formed again by hydrochloric acid treatment. On mixing with the initial salt, the melting point is not lowered.

Analysis.—Calculated for $C_9H_{11}ClN_4O_2$ (percent): C, 44.51; H, 4.53; Cl, 14.63. Found (percent): C, 44.9, 44.8; H, 4.80, 4.63; Cl, 14.1.

EXAMPLE 4

On replacing the 5-nitro-1,2-dimethyl-3-indazolone-imonium chloride in Example 2 by its 6-nitro isomer prepared according to Example 3 there is formed under the same conditions 6-amino - 1,2 - dimethyl-3-indazolone-imonium chloride in the form of pale beige crystals which are very soluble in water.

Analysis.—Calculated for $C_9H_{13}ClN_4$ (percent): C, 50.80; H, 6.12; N, 26.36; Cl, 16.70. Found (percent): C, 50.4; H, 6.3; N, 25.8; Cl, 16.7.

When a solution of potassium iodide is added to a solution of the above salt, crystals of the corresponding less soluble iodide are formed.

*Analysis.*—Calculated for $C_9H_{13}IN_4$ (percent): C, 35.53; H, 4.28; N, 18.42; I, 41.76. Found (percent): C, 36.0; H, 4.33; N, 18.2; I, 42.6.

EXAMPLE 5

A solution of 20 parts of 6-amino-1,2-dimethyl-3-indazolium-imonium chloride in 90 parts of water and 8.8 parts by volume of 66° Bé. sulphuric acid are heated at 180° C. for 6 hours in an autoclave. The mixture is allowed to cool to 100° C. and the autoclave is opened, a little active carbon is added and the product is filtered and the filtrate cooled. A first crystalline fraction is thus obtained of 6-hydroxy-1,2-dimethyl-3-indazolone-imonium chloride, which is filtered off, washed with a saturated solution of sodium chloride, drained and dried in an oven. Dry weight: 13.5 parts. A second fraction of the same salt, viz. 2.3 parts, is obtained by the addition of 20 parts of sodium chloride to the mother liquors. The product is recrystallised from methanol or water for analysis.

*Analysis.*—Calculated for $C_9H_{12}ON_3Cl\frac{1}{2}H_2O$ (percent): C, 48.52; H, 5.84; N, 18.87; Cl, 15.96. Found (percent): C, 48.2, 48.7; H, 5.64, 5.83; N, 18.9, 19.1; Cl, 16.0, 15.9.

EXAMPLE 6

A solution of 20 parts of 5-amino-1,2-dimethyl-3-indazolone-imonium chloride in 90 parts of water and 8.8 parts by volume of 66° Bé. sulphuric acid is heated to 200° C. for 6 hours in an autoclave. The product is allowed to cool to 100° C., a little active carbon is added, and it is filtered and 20 parts of sodium chloride are added to the filtrate, and it is filtered after cooling. The crystalline precipitate is taken up in boiling absolute ethanol in order to separate the mineral salts and the filtered solution is evaporated to dryness. 14.4 parts of 5-hydroxy-1,2-dimethyl-3-indazolone-imonium chloride in the form of white crystals which are very soluble in water are thus obtained. The aqueous solution has a blue fluorescence. The product is recrystallised from ethanol for analysis.

*Analysis.*—Calculated for $C_9H_{12}ClN_3O$ (percent): C, 50.60; H, 5.62; N, 19.67; Cl, 16.61. Found (percent): C, 51.1, 51.0; H, 6.2, 5.97; N, 19.8, 20.1; Cl, 16.2.

EXAMPLE 7

A mixture of 45.2 parts of 1,2-dimethyl-indazolium 3-sulphonate, 28 parts of hydroxylamine hydrochloride and 84 parts by volume of triethylamine in 700 parts by volume of absolute ethanol is refluxed for half an hour. It is then poured into 3000 parts of water and 750 parts of salt are added. The mixture is cooled and the white crystalline precipitate is filtered off, dried and recrystallised from methanol. Dry weight obtained: 30 parts. This product probably consists of 1,2-dimethyl-imino-indazolone-3-sodium sulphonate crystallised with half a molecule of water.

*Analysis.*—Calculated for $C_9H_{10}N_3O_3SNa\frac{1}{2}H_2O$ (percent): C, 39.70; H, 4.04; N, 15.43; Na, 8.47. Found (percent): C, 39.9; H, 4.31, 4.27; N, 15.57, 15.39; Na, 7.8.

10 parts of this compound are heated under reflux for half an hour in 50 parts of water and 7.5 parts by volume of 10 N hydrochloric acid. On cooling, white crystals of 1,2-dimethyl-3-indazolone-imonium chloride are precipitated, and are filtered off and dried in an oven. Dry weight obtained: 7 parts, which may be recrystallised from absolute ethanol for analysis.

*Analysis.*—Calculated for $C_9H_{12}ClN_3$ (percent): C, 54.68; H, 6.08; N, 21.25; Cl, 17.98. Found (percent): C, 54.9, 54.7; H, 6.16, 6.02; N, 21.6, 21.7; Cl, 17.7.

When an aqueous solution of the last compound is treated with caustic soda, a colourless oil separates which consists of 1,2-dimethyl-3-indazolone-imine. After drying and distilling, the product boils at 172–173° C. under 15 mm.

*Analysis.*—Calculated for $C_9H_{11}N_3$ (percent): C, 67.08; H, 6.83; N, 26.07. Found (percent): C, 67.5, 67.8; H, 7.02, 7.38; N, 25.5.

When taken up in concentrated hydrochloric acid, this oil forms a white precipitate which is recrystallised from water, then from ethanol. The 1,2-dimethyl-3-indazolone-imonium chloride described above is recovered.

*Analysis.*—Calculated for $C_9H_{12}ClN_3$ (percent): C, 54.68; H, 6.08; N, 21.25; Cl, 17.98. Found (percent): C, 54,9, 54.8; H, 6.02, 6.37; N, 21.4, 21.3; Cl, 17.5.

EXAMPLE 8

On replacing the 1,2-dimethyl-indazolium-3-sulphonate in Example 7 by 52 parts of its derivative chlorinated in position 5 one obtains under similar conditions a white crystalline product which is recrystallised from an ethanol-water mixture for analysis. The probable constitution is that of 1,2-dimethyl-5-4chloroindazolium-imino-3-sodium sulphonate associated with half a molecule of water.

*Analysis.*—Calculated for $C_9H_9ClN_3O_3SNa\frac{1}{2}H_2O$ (percent): C, 35.22; H, 3.26; N, 13.69; Cl, 11.58; S, 10.43. Found (percent): C, 35.3, 35.4; H, 4.19, 3.96; N, 13.8, 13.6; Cl, 10.9; S, 10.2, 10.4.

The action of hydrochloric acid on this compound, under the conditions described in Example 7, leads to 1,2-dimethyl-5-chloro-3-indazolone-imonium chloride, which is recrystallised from ethanol for analysis.

*Analysis.*—Calculated for $C_9H_{11}Cl_2N_3$ (percent): C, 46.55; H, 4.74; N, 18.10; Cl, 30.6. Found (percent): C, 46.3, 47.2; H, 5.09, 5.17; N, 17.9, 18.1; Cl, 30.2.

EXAMPLE 9

On operating as in Example 1 with 119 parts of 5,7-dichloro-1,2-dimethyl-3-indazolium-sulphonate in 1400 parts by volume of absolute ethanol, 165 parts by volume of trimethylamine and 55 parts of hydroxylamine hydrochloride one obtains 39 parts of 5,7-dichloro-1,2-dimethyl-indazolone-oxime which are recrystallised from ethanol for analysis to give white crystals, M.P. 105° C.

*Analysis.*—Calculated for $C_9H_3Cl_2N_3O$ (percent): C, 43.86; H, 3.66; N, 17.07; Cl, 28.87. Found (percent): C, 43.9, 43.8; H, 3.81, 3.89; N, 16.9, 16.7; Cl, 28.4, 28.0.

When 32 parts of this oxime are boiled for 5 minutes in a mixture of 20 parts by volume of concentrated hydrochloric acid and 150 parts of water, it gives after cooling a white crystalline precipitate of 5,7-dichloro-1,2-dimethyl-3-indazolone-imonium chloride which is recrystallised from methanol for analysis.

*Analysis.*—Calculated for $C_9H_{10}Cl_3N_3$ (percent): C, 40.50; H, 3.75; N, 15.74; Cl, 39.98. Found (percent): C, 40.5, 40.8; H, 3.59, 3.69; N, 16.0, 15.7; Cl, 39.5, 39.3.

EXAMPLE 10

8.3 parts of diethylamine are introduced into a mixture of 5.2 parts of 1,2-dimethyl-3-chloro-6-nitro-indazolium chloride, 2.7 parts of hydroxylamine hydrochloride and 70 parts by volume of absolute ethanol. The mixture is boiled for half an hour, poured into 100 parts of water, cooled in ice and the red precipitate formed is filtered off. It is 6-nitro-1,2-dimethyl-3-indazolone-oxime of M.P. 166° C. already obtained in Example 3.

EXAMPLE 11

6.4 parts of 1,2-dimethyl-6-amino-3-indazolone-imonium chloride and 2.1 parts of sodium nitrite are dissolved in 100 parts of water. This solution is introduced while stirring into a mixture maintained at between 0° C. and 5° C. of 100 parts of water and 10 parts by volume of 10 N hydrochloric acid. Stirring is continued for 20 minutes, the slight excess of nitrous acid is destroyed by the addition of sulphamic acid, and the diazo solution is poured into a solution of 5.6 parts of N-diethylaniline in 120 parts of water and 3 parts by volume of 10 N hydrochloric acid.

Then in order to finish the coupling process, a solution of sodium acetate is introduced until the excess hydrochloric acid has been neutralised. The diazo compound disappears rapidly and the dyestuff is precipitated. It is filtered off, washed with 10% brine, drained and dried at 100° C. Weight obtained: 8.3 parts of a dyestuff which is very soluble in water.

A solution of 0.5 parts of this dyestuff in 200 parts of water is prepared. 2 parts of acetic acid containing 60 g. per litre and 0.5 part of a product of condensation of caster oil with ethylene oxide are added. 100 parts of fibres based on acrylonitrile polymer are introduced at 50° C., the bath is brought progressively to the boil and maintained at this temperature for an hour and a half. A bright red shade endowed with excellent general fastness is obtained.

EXAMPLE 12

The coupling compound in Example 11 is replaced by a solution of 3.12 parts of 3-methyl-5-pyrazolone in 120 parts of N/2 caustic soda. Running the diazo compound into this solution causes the instantaneous formation of a yellow dyestuff. 60 parts of sodium chloride are added and the dyestuff is filtered off, drained and dried in an oven. Dry weight obtained: 7.8 parts of a dyestuff dyeing acrylic fibres a bright greenish yellow shade of excellent general fastness.

In the following table some dyestuffs prepared in a similar way with the same diazo compound are grouped together.

| | Coupling compound | Shade on acrylic fibres |
|---|---|---|
| Example: | | |
| 13 | Phenol | Yellow. |
| 14 | N-dimethylaniline | Bright scarlet. |
| 15 | N-dimethyl-2,5-dimethoxy-aniline. | Orange. |
| 16 | Acetyl m-phenylenediamine | Orange yellow. |
| 17 | 3-methoxy-diethylaniline | Coral. |

EXAMPLE 18

On replacing 1,2-dimethyl-6-amino-3-indazolone-imonium chloride in Example 12 by its 5-amino isomer one obtains under the same conditions a dyestuff which dyes acrylic fibres in fast yellow shades.

EXAMPLE 19

A well homogenised paste of 13.8 parts of finely ground p-nitraniline, 50 parts of water and 7 parts of sodium nitrite is introduced in fractions into a well stirred mixture of 250 parts of water and 40 parts of 10 N hydrochloric acid maintained at between 5° C. and 10° C. After stirring for half an hour, the slight excess of nitrous acid is destroyed by the addition of sulphamic acid and the diazo compound is filtered and introduced into a solution of 25 parts of 1,2-dimethyl-5-amino-3-indazolone-tion of 25 parts of 1,2 - dimethyl-5-amino-3-indazolone-temperature. The coupling is finished by neutralising the excess of hydrochloric acid by adding a solution of sodium acetate. The precipitated dyestuff is filtered off, washed with 10% brine, drained and dried in an oven. Dry weight obtained: 35 parts. It dyes acrylic fibres in violet shades having excellent general fastness.

EXAMPLE 20

On replacing the coupling compound in Example 19 by its 6-amino isomer one obtains under the same conditions a dyestuff which dyes acrylic fibres in fast orange shades.

EXAMPLE 21

On running a diazo compound prepared as in Example 19 into a solution of 24 parts of 1,2-dimethyl-5-hydroxy-3-indazolone-imonium chloride in 250 parts of water, and neutralising the excess of free acid by slowly running a solution of trisodium phosphate into the mixture, a precipitate dyestuff is obtained which is filtered off, drained and dried in an oven. Dry weight obtained: 38 parts. It dyes acrylic fibres in violet shades having excellent general fastness, especially to light.

EXAMPLE 22

On replacing the coupling compound in Example 21 by its 6-hydroxy isomer one obtains under the same conditions a dyestuff which dyes acrylic fibres a bright orange.

In the following table a number of examples analogous to the four preceding examples are grouped together.

Shades on acrylic fibres—Coupling compound:

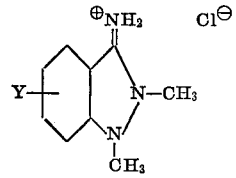

| Diazo compound | Ex. | Y=NH$_2$—5 | Ex. | Y=NH$_2$—6 | Ex. | Y=OH—5 | Ex. | Y=OH—6 |
|---|---|---|---|---|---|---|---|---|
| m-Nitraniline | 23 | Red | 24 | Golden yellow | 25 | Scarlet | 26 | Golden yellow |
| o-Nitraniline | 27 | Bordeaux | 28 | Orange yellow | 29 | Ruby | 30 | Orange. |
| p-Chloraniline | 31 | Brownish red | 32 | Yellow | 33 | Bright red | 34 | Bright orange. |
| m-Chloraniline | 35 | Scarlet | 36 | do | 37 | Bluish red | 38 | Orange. |
| o-Chloraniline | 39 | Red | 40 | do | 41 | do | 42 | Do. |
| 2,5-dichloroaniline | 43 | Bordeaux | 44 | Golden yellow | 45 | do | 46 | Do. |
| 3,4-dichloroaniline | 47 | Red | 48 | do | 49 | Red | 50 | Golden yellow. |
| p-Anisidine | 51 | Coral | 52 | Yellow | 53 | Orange brown | 54 | Orange. |
| m-Anisidine | 55 | do | 56 | do | 57 | Red | 58 | Do. |
| o-Anisidine | 59 | Brownish red | 60 | Orange yellow | 61 | Red | 62 | Orange brown. |
| p-Toluidine | 63 | Orange | 64 | Yellow | 65 | Red | 66 | Orange. |
| m-Toluidine | 67 | Coral | 68 | do | 69 | Red | 70 | Do. |
| o-Toluidine | | | 71 | do | 72 | Red | 73 | Orange yellow. |
| p-Cresidine | 74 | Purplish red | 75 | Brown yellow | 76 | Currant | 77 | Reddish orange |
| 2-methyl-4-chloro-aniline | 78 | Red | 79 | Golden yellow | 80 | Red | 81 | Golden yellow. |
| 2-methoxy-5-chloro-aniline | 82 | Red violet | 83 | do | 84 | Ruby | 85 | Bright orange |
| 2-methoxy-4-nitro-aniline | 86 | Lavender blue | 87 | Red orange | 88 | Red violet | 89 | Bright red orange |
| 2-methoxy-5-nitroaniline | 90 | Bordeaux | 91 | Golden yellow | 92 | Bright bluish red | 93 | Orange yellow. |
| 4-methoxy-2-nitroaniline | 94 | Brownish red | 95 | Brown yellow | 96 | Violet | 97 | Bright orange red. |
| 2-methyl-4-nitroaniline | 98 | Lilac | 99 | Orange | 100 | Bright currant red | 101 | Bright orange. |
| 4-methyl-2-nitroaniline | 102 | Purplish red | 103 | Orange yellow | 104 | Red violet | 105 | Orange. |
| 2,4-dimethyl-3-nitroaniline | 106 | Red | 107 | Golden yellow | 108 | Bluish red | 109 | Orange yellow. |
| 2,4-dimethoxyaniline | | | | | 110 | Red brown | 111 | Reddish orange. |
| 4-sulphonamidoaniline | 112 | Brownish red | 113 | Golden yellow | 114 | Bluish red | 115 | Orange yellow. |
| 3-sulphonamidoaniline | 116 | Pale scarlet | 117 | Yellow | 118 | Red | 119 | Golden yellow. |
| 4-phenoxysulphonylaniline | 120 | Bordeaux | 121 | Golden yellow | 122 | Bluish red | 123 | Orange yellow. |
| 4-sulphofluoroaniline | 124 | Purplish red | 125 | do | 126 | Red | 127 | Do. |
| 3-trifluoromethylaniline | 128 | Scarlet | 129 | Yellow | 130 | Red | 131 | Golden yellow. |
| 2-trifluoromethyl-4-chloroaniline | 132 | Bluish red | 133 | do | 134 | Bluish red | 135 | Do. |
| p-Aminoazobenzene | 136 | Currant | 137 | Brownish orange | 138 | Currant | 139 | Orange. |

EXAMPLE 140

A homogeneous paste obtained by mixing 8 parts of the dyestuff described in Example 11, 20 parts of 80% acetic acid and 30 parts of thiodiglycol is poured into 372 parts of water at 90° C. 50 parts of thiourea are added to the clear solution obtained, then 500 parts of a thickener based on swollen gum tragacanth and finally 20 parts of a 50% solution of sodium chlorate.

The paste thus obtained is printed on a polyacrylonitrile fabric, the fabric is steamed for 15 to 20 minutes at a temperature between 105° C. and 110° C., rinsed in running water, then soaped in a bath containing 2 to 3 g. per litre of Marseilles soap. After drying a bright red print of excellent general fastness is obtained.

We claim:
1. An indazole compound of the formula:

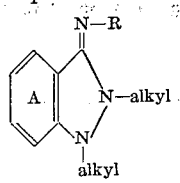

in which the alkyl groups in the 1- and 2- positions are the same or different and contain no more than four carbon atoms, R represents an OH or $SO_3H$ radical and the nucleus A is unsubstituted or substituted by halogen atoms or nitro groups.

References Cited

UNITED STATES PATENTS 2,964,402  12/1960  Jennen et al. _____ 260—310B

FOREIGN PATENTS 1,006,315  9/1965  Great Britain _____ 260—310B

OTHER REFERENCES

Berg et al.: Jour. Chem. Soc. (London), 1961, pp. 5275–7 and 5281.

Parnell: Jour. Chem. Soc. (London), 1959, pp. 2363–5.

NATALIE TROUSOF, Primary Examiner

U.S. Cl. X.R.

8—41; 260—37, 41, 160, 163, 299, 465